United States Patent
Fields

(10) Patent No.: US 6,245,850 B1
(45) Date of Patent: *Jun. 12, 2001

(54) REFLECTIVE ASPHALT EMULSIONS AND METHOD

(76) Inventor: John R. Fields, 22626 - 120th East, Sumner, WA (US) 98309

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/054,342

(22) Filed: Apr. 2, 1998

Related U.S. Application Data

(60) Provisional application No. 60/043,157, filed on Apr. 10, 1997.

(51) Int. Cl.$^7$ ..................................... G08K 3/34
(52) U.S. Cl. ................. 524/445; 106/277; 106/278; 106/600; 106/632; 106/633; 524/157
(58) Field of Search ................... 524/445, 157; 106/600, 632, 633, 277, 278

(56) References Cited

U.S. PATENT DOCUMENTS

| | | | |
|---|---|---|---|
| 4,494,992 | 1/1985 | Schilling et al. | 106/277 |
| 4,822,427 | 4/1989 | Graf et al. | 106/502 |
| 4,859,723 * | 8/1989 | Kyminas | 524/445 |
| 4,985,079 | 1/1991 | Graf et al. | 106/502 |
| 5,212,220 * | 5/1993 | Gelles | 524/68 |
| 5,273,683 | 12/1993 | Krivohlavek | 252/351 |
| 5,336,438 | 8/1994 | Schilling et al. | 252/311.5 |
| 5,558,702 | 9/1996 | Chatterjee et al. | 106/277 |
| 5,667,576 | 9/1997 | Chatterjee et al. | 106/277 |
| 5,667,577 | 9/1997 | Chatterjee et al. | 106/277 |
| 5,674,313 | 10/1997 | Aoyama et al. | 106/2 |

* cited by examiner

Primary Examiner—Bernard Lipman
(74) Attorney, Agent, or Firm—Brown Raysman Millstein Felder & Steiner LLP

(57) ABSTRACT

A reflective asphalt emulsion is formed by dispersing asphalt into a slurry of colloidal clay at high shear and thereafter blending titanium dioxide and diatomaceous earth filler, and optionally acrylic latex, at low shear into the emulsion of clay and asphalt to form a white to light gray emulsion having a soft consistency and good shelf life. Particle sizes of the employed asphalt are controlled in order to preserve reflectivity of the finished emulsion.

14 Claims, No Drawings

REFLECTIVE ASPHALT EMULSIONS AND METHOD

This application claims the benefit of U.S. Provisional Patent Application Ser. No. 60/043,157, filed Apr. 10, 1997, and entitled Reflective Asphalt Emulsions and Method.

TECHNICAL FIELD

The invention relates to bituminous coatings and sealants. More particularly, it relates to method and composition for reflective asphalt emulsions for roofing, waterproofing, paving, coating, and sealing.

BACKGROUND OF THE INVENTION

The present invention relates to reflective asphalt emulsions and more particularly to novel method and compositions for producing such reflective emulsions, which may be used advantageously as a roofing and waterproofing composition having superior characteristics.

Prior asphalt emulsion mixtures have been applied to roofs and other substrates, sometimes as a protective coating and sometimes as a re-cover system, using a reinforcing sheet. Such asphalt mixtures have little or no reflectivity in that they are typically black in color. In many circumstances, however, it has been found desirable to use asphalt coatings and sealants for roofing, paving, waterproofing, sealing, etc., with increased reflectivity. This is particularly true where the asphalt is exposed to sunlight and other solar radiations. For example, it has long been known that asphalt roofing installations are subject to moderately severe thermal expansion and contraction cycles as they heat beneath the sun during the day and cool at night. Repeated thermal shock cycles of this type lead to accelerated breakdown of the asphalt and destroy its effectiveness as a roofing, waterproofing, or sealing membrane, and therefore lead to eventual damage to the protected structure due to rain and weather. And while it has long been realized that increasing the reflectivity of such installations would decrease their absorption of solar radiation, and thereby reduce the thermal stresses and shock cycles to which they are subjected—and thus would prolong the life of the installations and of the structures they are intended to protect—no satisfactory means for increasing the reflectivity of asphalt has yet been put forward.

One proposal has involved the use of aluminum coating asphalts. Such asphalts provide a thin aluminum surface coating atop an installed asphalt layer (or membrane) and provide relatively high reflectivity. But while aluminum coating asphalts have been found to be extremely useful and beneficial in many applications, it has also been found that in many other circumstances they are not suitable. For example, the aluminum coating formed in the application of such asphalts is typically extremely thin, and, as the asphalt beneath or behind it hardens, the coating tends to become relatively brittle. In such circumstances relatively light physical impacts can break the coating, and cause flaking and therefore loss of reflectivity and even (when the asphalt beneath it breaks also) loss of moisture resistant integrity. For example, the surface of an installed aluminum coating roofing asphalt for a portion of a roof subjected to foot traffic (as for example for maintenance purposes) tends to break down and lose substantial portions of its reflectivity due to the stresses caused by individuals walking on it, leading to increased thermal shock loadings in the asphalt and eventual failure of the asphalt as a roofing membrane.

Another approach has been the simple painting of asphalt installations, using, for example, light-colored latex paints. But paints used in such installations typically cannot weather the stress of physical impacts, such as the walking previously described, or the ponding of water (as for example during or after rainstorms), and they do not wear well: they tend to both break down structurally and lose reflectivity with age and exposure.

Thus there is a need for a durable, wear-resistant, highly reflective asphalt suitable for use in roofing, waterproofing, and sealing applications, and for application at ambient temperatures.

DISCLOSURE OF THE INVENTION

It is accordingly an object of the invention to provide a means of producing a highly reflective asphalt membrane, as for example in a roofing, waterproofing, or sealing membrane.

It is another object of the invention to provide a reflective asphalt membrane that is highly durable and resistant to wear.

It is another object of the invention to provide roofing, waterproofing, and sealing membranes in the form of a black asphalt emulsion changed to a light colored (white to gray) asphalt emulsion, so as to provide a reflective asphalt emulsion which may be spread directly on surfaces exposed to the weather with or without the use of reinforcing sheeting.

It is another object of this invention to provide a reflective asphalt emulsion which is suitable for application at ambient temperatures.

It is a further object of this invention to provide method and composition for making such an asphalt emulsion by mixing an asphalt emulsion with a titanium dioxide pigment in a manner to maintain stable emulsification and result in a non-brittle emulsive coating having enhanced reflective properties.

It is a further object of the invention to provide method and apparatus for providing such compositions having improved elasticity, resistance to thermal shock cycles, and resistance to ozone and ultraviolet rays by including in such compositions white latex and/or SEBS rubber as additives.

The invention provides such an asphalt and method for producing them.

One aspect of the invention is a method for preparing an asphaltic emulsion of bentonite clay, asphalt, and water. One such method starts by initially mixing bentonite clay and a lignosulfonate dispersant in a high shear mixer, and a 100% oxidized emulsion grade or a paving grade asphalt having a softening point of about 110° to 180° F. at a temperature of about 240° to about 320° F. into a composition of about 30 to 60 percent and preferably about 45 percent by weight of asphalt. The mixture is sheared until the resulting composition is smooth. The resultant emulsion contains: (1) asphalt, (2) clay or other emulsifiers, (3) water, and (4) miscellaneous other chemicals in smaller quantities. Titanium dioxide pigment together with a small amount of filler, such as diatomaceous earth, is then added under low shear so that the emulsion does not break down. The titanium dioxide pigment is added in the amounts of from 10 to 20 percent by weight of the finished emulsion so that the finished color of the emulsion is white to light gray. The emulsion has a consistency of soft putty and is creamy in texture. The finished product has a weight of about 8.0 to 11.0 pounds per gallon and preferably about 9.0 to 10.0 pounds per gallon. The emulsion is stable and may be stored in containers before use. In another such method, the reflective asphalt is formed by preparing a slurry, at a temperature of from 100° to 130° F., of bentonite clay and water with an emulsifier and/or a dispersant; preheating an asphalt having a softening point of from about 100° to about 180° F. to a temperature within the range from about 240° to about 320° F. and mixing said slurry with said asphalt while agitating at a shearing speed of about 2000 rpm to emulsify the slurry and asphalt into a paste; cooling said paste to below about 100° F.; blending at low shear a quantity of titanium dioxide pigment and a small quantity of diatomaceous earth filler into said paste so that the resulting paste has a white to light gray color and a soft consistency. Another aspect of the invention comprises a product produced by this method and used for coating surfaces, the product being characterized by having a high reflectivity of various electromagnetic waves, including particularly visible solar radiations.

A particularly advantageous variant of the method aspect of the invention is a method for preparing a reflective asphaltic emulsion of an emulsifier, a dispersant, asphalt, and water. This method comprises the steps of preparing a slurry at a temperature of from 100° F. to 130° F. of an emulsifier and water; preheating an asphalt having a softening point of from about 90° F. to about 225° F. to a temperature within the range from about 240° F. to about 320° F.; mixing the slurry with said asphalt at a shearing speed in the range of about 1000 rpm to about 2000 rpm to emulsify the slurry and asphalt into a paste; cooling said paste to below about 100° F.; and blending at low shear a quantity of titanium dioxide pigment into said paste so that the resulting paste has a white to light gray color and a soft consistency. Preferably the emulsifier used in this method comprises a colloidal clay, and in particular bentonite clay. A preferred dispersant is lignosulfonate, and in particular sodium lignosulfonate. Optional additional steps in the method comprise the addition of a coagulant, preferably ferric chloride, to the water-dispersant slurry; and the blending with the aforementioned past of an acrylic latex pigment.

It has also been found to be particularly advantageous, in making emulsions according to the invention, to mix, grind, or blend the asphalt and the slurry such that the resulting emulsion comprises particles having average diameters in the range of about 10 to about 50 microns. Preferably, this is reflected by a rating for the emulsion, when tested, in the range of about 4.5 to about 5 on a Hegman scale. It has been found that grinding the asphalt to a smaller size causes the emulsion to turn brown, while maintaining a 10–50 micron diameter size allows the emulsion to retain an extremely satisfactory white or light gray color.

It has been found that in many cases reflective asphalt emulsions according to the invention exhibit properties in common with their underlying asphalt emulsions. For example, a reflective emulsion based on a non-oxidized flux asphalt tends to exhibit the relatively low softening point and low resistance to thermal shock cycles characteristic of its asphalt base. Likewise, improvements in the base asphalt are typically apparent in the reflective product as well. For example, the advantages realized through the addition of rubber to the base asphalt are typically enjoyed by the reflective product as well. Thus preferred reflective compositions according to the invention comprise rubber modifiers. In general, the addition of at least about 1% rubber results in improved durability and resistance to thermal shock cycles. A particularly useful modifier is styrene-ethylene-butylene-styrene (SEBS) block copolymer. Methods and compositions for producing SEBS modified asphalts and asphalt emulsions are described in my patent application Ser. No. 08/978,243, filed Nov. 25, 1997, U.S. Pat. No. 5,973,037 and entitled "Styrene Ethylene Butylene Styrene (SEBS) Copolymer Rubber Modified Asphalt Mixture"; and Ser. No. 08/978,244, filed Nov. 25, 1997, U.S. Pat. No. 5,929,144 and entitled "Plasticized Styrene Ethylene Butylene Styrene (SEBS) Copolymer Rubber Modified Asphalt Mixture." The methods and compositions taught in those patent applications are suitable for use in the invention described herein, and the specifications for those applications are hereby incorporated in this specification, as if set out fully herein, to supplement the processes and explanations provided herein, and to support my teaching of the art of making reflective asphalt emulsions.

Preferred embodiments of the invention further typically comprise a variety of fillers for the improvement of bulk, adhesiveness, strength, and wear resistance. One such filler comprised by preferred reflective compositions according to the invention is diatomaceous earth. In addition to adding bulk to the reflective emulsion aspect of the invention, diatomaceous earth increases the thermal insulation value of the coating while aiding the process of making the emulsion lighter in color by adding to the light gray tone of the emulsion, and helps foster a soft consistency to the finished emulsion prior to installation.

Another aspect of the invention comprises a reflective asphaltic emulsion comprising at least about 25% by weight asphalt, at least about 25% by weight water, an emulsifier, and a titanium dioxide pigment. Preferably, emulsions according to this aspect of the invention comprise between about 5% and about 25% by weight titanium dioxide. Preferred emulsifiers for such aspects of the invention comprise a colloidal clay, in particular bentonite clay. Optionally, such embodiments of the invention further comprise, as previously discussed, lignosulfonate dispersants, including in particular sodium lignosulfonate; a coagulant such as ferric chloride; latex pigment, rubber modifiers, including SEBS block copolymers; and fillers including diatomaceous earth.

The compositions described herein are useful as ambient applied asphalt emulsion coating materials used for roofing and waterproofing systems where reflectivity of the sun's rays are desired.

BEST MODE FOR CARRYING OUT THE INVENTION

A first step in the preparation of the reflective asphaltic emulsions of the invention is the production of a base asphalt emulsion, by one of the various methods of emulsifying asphalt. One such method starts by mixing a significant amount of an emulsifier such as bentonite clay with water in a low-shear mixing vessel at about 100° to 130° F. The mixture is blended at low speed for several minutes, as for example for about 5 to about 10 minutes at about 600 to about 700 rpm in a Meyers mixer of the type herein below described, until the mixture is visually smooth and homogeneous. Optionally at this point a coagulant and/or pH balancer such as ferric chloride is added, preferably enough to bring the mix to a pH level of from about 3 to about 5, most preferably within the range from 3.6 to 4.0. When iron-based coagulants such as ferric chloride are used, an optional additional step is the addition of a rust inhibitor such as sodium dichromate. With the pH balanced, a dispersant such as a lignosulfonate, preferably sodium lignosulfonate, is added to reduce the viscosity of the slurry and to prevent binding or unsatisfactory stiffness in the emulsion as the asphalt is added and blended. As will be appreciated by those familiar with the making of asphalt products, somewhat more dispersant is added to products intended for spray application (in order to facilitate the spraying process and accommodate limitations on spray equipment) than to products intended for mop or blade installations, which are desirably more viscous. Typically the slurry is mixed for approximately an additional 10 minutes under the conditions described above, until it has a generally fluid, paint-like viscosity, which has been found to produce a most satisfactory emulsion. The mixer speed is then preferably increased to the range of about 1100 to about 1500 rpm and asphalt is added. Any desired asphalt composition may be used, including for example either oxidized or unoxidized roofing or paving grade asphalts, with or without rubber modifiers. The asphalt, which typically has a softening point in the range of about 90° F. to about 225° F., is injected into the mixture at a temperature of about 240° F. to 320° F., preferably in incremental batches to promote consistency in emulsification. For example, in an emulsion which will ultimately comprise 30 to 60 percent asphalt by weight, it has been found to be advantageous to add the asphalt in three or more equal batches, allowing the blender to work at high speed and blend the emulsion for about 5 to about 10 minutes between batch additions. Once all of the asphalt has been added a biocide such as Troysan 174 is optionally added. The resulting emulsion is then moved to a holding tank and cooled to below about 100° F., and preferably below about 80° F. The emulsion then is returned to the mixing tank (or to a second mixing tank) and diluted by blending at low speed with a small known quantity of water. An absorption compound such as a precipitated silica (silicon dioxide is preferred) is optionally added to remove unbound lighter end residues, and (preferably commercially pure) titanium dioxide is added as a pigment and blended with the emulsion. It has been found that blending of the titanium dioxide pigment is eased if the pigment is added first to approximately half of the emulsion base and thoroughly blended, with the remainder of the emulsion being added gradually. It has also been found to be advantageous to occasionally boost the mixing speed during blending of the pigment to a higher speed for short periods in order to aid blending, with the bulk of the blending taking place at low speed. (For example, in a Meyers mixer it has been found advantageous to conduct most of the blending at about 600 to about 700 rpm, with the speed being occasionally increased to 1000 to 1500 rpm for periods of a minute or so.) At this point additional biocide is optionally added. The viscosity of the final reflective emulsion is controlled, where desired, by the addition of additional ("secondary") dispersants or thinners, such as for example Daxad 30, available through the Hampshire Chemical Corporation of Massachusetts. If desired, other fillers, such as diatomaceous earth, may be added at a low shear mixing rate so that the emulsion achieves a desirable consistency, preferably that of a soft putty, and a desirable color, preferably white to light gray, as well as desired bulk, thermal insulation, and other properties. Preferably the finished reflective asphalt has a weight of from about 8.0 to about 11.0 pounds per gallon, most preferably from about 9.0 to about 10.0 pounds per gallon, with a solids content of from 40 to 60 percent and preferably from 45 to 55 percent. The finished product is stored in bulk tanks or is packaged in drums and pails for convenient sale and use by the consumer.

Asphalts suitable for use in making the compositions disclosed herein include bituminous materials or hydrocarbons, with or without additives, fillers, or aggregates, having sufficient insolubility in water and viscosity to be used advantageously in roofing, sealing, paving, or waterproofing, whether naturally occurring or distilled from petroleum or like products. In particular such asphalts include, without limitation, straight-run asphalts or asphalts modified by the addition of rubbers or other polymers, coal, tar, and pitch, as well as all bitumens and modified bituminous materials, whether oxidized or unoxidized. As previously mentioned, and as described in detail in my related patent application Ser. No. 08/978,243, filed Nov. 25, 1997, and entitled "Styrene Ethylene Butylene Styrene (SEBS) Copolymer Rubber Modified Asphalt Mixture", now U.S. Pat. No. 5,973,037 and Ser. No. 08/978,244, filed Nov. 25, 1997, and entitled "Plasticized Styrene Ethylene Butylene Styrene (SEBS) Copolymer Rubber Modified Asphalt Mixture now U.S. Pat. No. 5,929,144," specifications of which have previously been incorporated herein, SEBS rubber modified asphalts are preferred. Rubber modified asphalts used in asphaltic compositions according to the invention generally comprise at least about 1% by weight rubber, most preferably between about 1% and about 25%. Specifically, preferred SEBS modified asphalts comprise between about 3% and about 10% by weight styrene-ethylene-butylene-styrene block copolymer.

Suitable mixers for use in preparing reflective asphalt compositions according to the invention include any mixers capable of providing satisfactory emulsions of the type described, and in particular those capable of doing so without reducing the asphalt particles to too small a size. Non-reflective asphaltic emulsions intended for application at ambient temperatures in roofing, waterproofing, or sealing membranes have typically comprised substantial proportions of asphaltic particles of approximately 5 to approximately 15 microns in size (measured across their greatest dimension, which might be figuratively referred to or thought of as their "diameter"). Emulsifier-coated asphalt particles generally have irregular shapes, for convenience the greatest dimension is referred to as the "diameter." In a typical high-grade non-reflective asphalt emulsion, approximately 90% (or more) of the coated asphalt particles have a diameter of 10 microns or less. It has been found, however, that mixing reflective emulsions having particles of such size results in brownish-colored mixtures exhibiting relatively low reflectivity and therefore being relatively less effective for meeting the objects of the invention. While undesirable discoloration of this type may be corrected by the addition of higher levels of titanium dioxide or other pigments, the addition of further pigment, as herein elsewhere discussed, has been observed to have detrimental effects on the durability, flexibility, and overall suitability of the finished reflective asphalt for its intended purpose. It is believed that the cause of the discoloration described is the increased surface area comprised by the reduced-size particles, all of which must be covered by the pigments. Thus it was believed that the use of asphalts having particles of somewhat larger size would improve the coloration of the finished emulsion, and in fact this has been borne out. It has been observed that the use of asphalts comprising particles having greatest dimensions in the range of from about 10 to about 50 microns, and preferably from about 10 to about 30 microns, results in significantly improved reflectivity and coloration. In general, it has been found that the use of asphalt emulsions comprising coated particles approximately 90% of which have greatest dimensions of approximately 15 to approximately 25 microns is optimal in producing the reflective asphaltic emulsions of the invention. Quite satisfactory results, it has been found, may be achieved by monitoring the emulsification process to ensure that the mixing and/or grinding results in an emulsion which, when tested on the Hegman scale, rates in the range of about 4.5 to about 5. A particular mixer suitable for use in making emulsified reflective asphalts according to the invention is a dual shaft Meyers Dispersion Mixer, Model No. 550A-50-100/50/516, as available through the C. K. Bud Meyers Company of Bell, California, mounted in an unheated 1000 gallon mixing tank. A suitable Hegman scale is provided in the Fineness of Grind Gauge, with Scraper, Model No. 5254, available through the Paul N. Gardner Company of Florida.

Generally, any emulsifier (sometimes also referred to in the industry as a "dispersant") suitable for use in making asphalt emulsions of the type described herein is suitable for making reflective asphalt compositions according to the invention. Among the best emulsifiers for these purposes are the colloidal clays, in particular bentonite clay, which is sometimes also known as wilkenite. Typical colloidal clays comprise substantial amounts of aluminum silicates, and usually some magnesium and iron as well. One example of a suitable emulsifier for use with the invention is Volclay SPV2000, available through the American Colloid company.

Titanium dioxide pigments suitable for use in preparing reflective asphalt compositions according to the invention include any pigments comprising significant amounts of titanium dioxide and capable of imparting to the finished emulsion a relatively reflective coloring. Preferred compounds comprise commercially pure titanium dioxide, titanic anhydride, titanic acid anhydride, titanic oxide, titanium white, and/or titania, such as for example that sold under the trade designation CR50 by the Ishihara company of Japan. While reflective emulsions according to the invention may advantageously comprise between 1% and 25% by weight or more titanium dioxide pigments, preferred compositions comprise approximately 5% to approximately 20% by weight titanium oxide. In general, the addition of more than about 20% titanium oxide tends to make the reflective composition unsuitably brittle after drying or setting, while insufficient amounts defeat the purpose of making the asphalt reflective.

Preferred compositions according to the invention optionally further comprise coagulants used to control the viscosity and consistency of the water-emulsifier slurry and the subsequent emulsified product, and optionally to control pH levels in the slurry and the finished emulsion. The use of ferric chloride as a coagulant is especially beneficial, in that it accomplishes the purposes of coagulant and pH adjustment in entirely suitable fashion.

Preferred compositions according to the invention further optionally comprise dispersants, entered at the slurry stage, to ensure even dissolution and distribution of the emulsifier within the slurry. This is particularly advantageous when colloidal clays are used as emulsifiers. Such dispersants also serve to keep the viscosity of the slurry, and of the ultimate emulsification, suitable for the mixing process. In general, the dispersant is added in controlled amounts to reduce the viscosity of the slurry prior to entry of the asphalt. A particularly satisfactory dispersant for use with the invention, and in particular in compositions of the type described herein comprising colloidal clays, is lignosulfonate, and in particular sodium lignosulfonate such as that marketed under the tradename Lignosite 458 by Van Waters and Rogers of Kent, Wash.

An optional and particularly advantageous means of enhancing the reflectivity of the ultimate reflective asphalt product, and of maintaining or improving other properties of the product, is the addition of acrylic latex pigment to the emulsion. Typically such pigments are added after the asphalt has been blended with the slurry, but they may optionally be added at other points during the process. Preferred latexes for these purposes are white or otherwise light-colored (as for example light gray), latexes such as the Styrene Acrylic Latex No. 123 available through the Union Carbide company of North Carolina. In addition to improving the reflectivity of the asphalt, the addition of latex pigments can improve the adhesive qualities of the asphalt, its resistance to weathering, and its flexibility. Latex pigments also tend to stabilize the coloring of the asphalts at and after installation, so that spotting and discoloration with age and weathering are reduced.

It is also preferable in many instances to add to reflective asphaltic compositions according to the invention significant amounts of fillers, so as to add bulk, strength, adhesiveness, thermal insulation, and/or other selected properties to the compositions. In general, the selection and addition of such fillers is a well-understood process, and one familiar to those engaged in the making of asphaltic compositions. The addition of at least one particular filler, however, provides non-obvious benefits not enjoyed by many applications outside the scope of the present invention. Specifically, it has been found to be particularly advantageous to add significant amounts of diatomaceous earth (also sometimes known as silica, kieselguhr, siliceous earth, ceyssatite, tripolite, and infusorial earth) to reflective asphaltic compositions according to the invention. The addition of diatomaceous earth to the compositions disclosed herein has been found to improve the reflectivity and consistency of the compositions. The reflectivity of the compositions is improved both by the contribution of the light-gray hue of the diatomaceous earth itself, and by the relatively flat constituent particles of the filler, which contribute to the smoothness and reflectivity of the surface of the emulsion after it has been installed and has set. Celite brand flux calcined diatomaceous earth, available through the Celite Corporation of Lompoc Calif., is an example of a diatomaceous earth suitable for use with the invention.

As previously described, it is also advantageous in preparing some compositions according to the invention to add to the emulsion (preferably following addition of the asphalt to the slurry) an optional absorption compound such as a precipitated silica (in particular, silicon dioxide) to remove unbound lighter end residues. One such absorption compound suitable for use in preparing the compositions described herein is commercially available through the Harwick company of Akron, Ohio, under the trade name Hi-Sil 233, and comprises significant amounts of hydrated amorphous silica absorbants.

In addition to the advantages previously cited, the reflective properties of the reflective asphaltic compositions as disclosed herein tend to improve with age. It has been found that one effect of weathering on installed reflective asphalts of the type described herein is to lighten the color of the asphalts, thereby improving their reflectivity and enhancing their effect in achieving the objects of the invention. It is believed that this effect is caused by wearing of the titanium dioxide particles on the surface of the asphalt, which results in a smoother and therefore shinier surface.

Preferred amounts of various ingredients of preferred compositions for making reflective asphaltic emulsions according to the invention are given in Table 1.

TABLE 1

| INGREDIENT | PREFERRED CONTENT (% weight finished emulsion) |
|---|---|
| Asphalt | 25–50 |
| Water | 25–55 |
| Emulsifier (e.g. bentonite clay) | 1–10 |
| Dispersant (e.g. sodium lignosulfonate; optional) | 0.05–0.2 |
| Coagulant (e.g. ferric chloride; optional) | 0.05–0.2 |
| Rust inhibitor (e.g. sodium dichromate; optional) | 0.05–0.2 |
| Biocide (e.g. Troysan 174; optional) | 0.05–0.2 |
| Absorption compound (e.g. silicon dioxide; optional) | 0.05–0.2 |
| Filler (diatomaceous earth, optional) | 0.05–10 |
| Secondary dispersant (e.g. Daxad; optional) | 0.05–0.2 |
| Titanium dioxide pigment | 1–25 |
| Acrylic latex (optional) | 0.05–15 |

EXAMPLE

A titanium dioxide pigmented asphalt emulsion is prepared in a 1,000 gallon mixing tank equipped with a dual shaft Meyers Dispersion Mixer. 415 gallons of water at 100° to 130° F. is mixed at about 600–700 rpm with 300–360 pounds of bentonite clay and 4–9 pounds of 458 brand lignosulfonate dispersant obtained from Van Waters and Rogers of Kent, Wash. When thoroughly mixed, 19 pounds of ferric chloride is added, along with 3 pounds sodium dichromate, to obtain a pH in the range of 3.0 to 5.0. Once the pH is verified and stabilized and the mixture has taken on a smooth, visually fluid, paint-like consistency, an emulsion grade asphalt having a softening point of 100° to 180° F. and heated to a temperature of 240° to 320° F. is slowly added to the tank through an in-line valve. To blend the asphalt, the Meyers mixer is set at a dispersion speed of about 1,300 rpm. 380 gallons of SEBS modified asphalt is added to the tank to give a level of about 45 percent by weight of the total batch. The high shear mixing is continued for about 10 minutes and about 8 pounds of Troysan 174 biocide is added. The emulsion is then transferred to a holding tank to cool. Once the emulsion is cooled to below about 100° F., it is returned to the mixing vessel (or moved to a second vessel) and diluted with about 60 to about 180 gallons of cold water. 80 pounds of Hi-Sil 233 synthetic precipitated silica is added to soak up unbound lighter end residues, along with about 100 pounds of Celite 522 diatomaceous earth filler and 1,300–1,400 pounds of titanium dioxide pigment in powder form. The mixture is blended using a low shear mixing speed to avoid breaking the emulsion. A second gallon of Troysan 174 biocide is added, along with approximately 30 gallons Union Carbide Acrylic Latex 123. The product is mixed at low speed until smooth and creamy, with a consistency resembling a soft pudding, and is white to light gray in color. The product weighs between 9.5 and 10.0 pounds per gallon and has 45 to 55 percent solids. About 950 gallons of reflective asphalt emulsion results. The product is transferred to a finished product storage tank for bulk sales and a portion thereof is put into 55 gallon drums and into 5, 3, and 1 gallon pails or stored in bulk for sale to customers.

INDUSTRIAL APPLICABILITY

A reflective asphalt emulsion containing titanium dioxide is described which finds use as an ambient applied reflective roofing and waterproofing compound. As compared to earlier-known asphalts, the invention provides opportunities for unparalleled improvements in thermal shock resistance and solar light/heat reflection.

I claim:

1. An asphaltic emulsion for coating a surface, said emulsion having a high reflectivity, the emulsion comprising bentonite clay, asphalt, and water, and produced by: preparing a slurry at a temperature of from 100° to 130° F. of bentonite clay and water with a dispersant; preheating an asphalt having a softening point of from about 100° to about 180° F. to a temperature within the range from about 240° to about 320° F.; and mixing said slurry with said asphalt while agitating at a shearing speed of about 2000 rpm to emulsify the slurry and asphalt into a paste; cooling said paste to below about 100° F.; blending at low shear, between about 1% and about 25% by weight titanium dioxide pigment, and a small quantity of diatomaceous earth filler into said paste so that the resulting paste has a white to light gray color and a soft consistency.

2. A reflective asphaltic emulsion comprising at least about 25% by weight asphalt, at least about 25% by weight water, an emulsifier, and between about 1% and about 25% by weight titanium dioxide pigment.

3. The reflective asphaltic emulsion of claim 2, wherein the emulsifier comprises a colloidal clay.

4. The reflective asphaltic emulsion of claim 3, wherein the colloidal clay comprises bentonite clay.

5. A reflective asphaltic emulsion comprising at least about 25% by weight asphalt, at least about 25% by weight water, an emulsifier, between about 1% and about 25% by weight titanium dioxide pigment, and a dispersant.

6. The reflective asphaltic emulsion of claim 5, wherein the dispersant comprises a lignosulfonate.

7. A reflective asphaltic emulsion comprising at least about 25% by weight asphalt, at least about 25% by weight water, an emulsifier, between about 1% and about 25% by weight titanium dioxide pigment, and a coagulant.

8. The reflective asphaltic emulsion of claim 2, wherein the coagulant comprises ferric chloride.

9. A reflective asphaltic emulsion comprising at least about 25% by weight asphalt, at least about 25% by weight water, an emulsifier, between about 1% and about 25% by weight titanium dioxide pigment, and acrylic latex pigment.

10. A reflective asphaltic emulsion comprising at least about 25% by weight asphalt, at least about 25% by weight water, an emulsifier, between about 1% and about 25% by weight titanium dioxide pigment, and about 1% rubber.

11. The reflective asphaltic emulsion of claim 10, wherein said rubber comprises styrene-ethylene-butylene-styrene block copolymer.

12. A reflective asphaltic emulsion comprising at least about 25% by weight asphalt, at least about 25% by weight water, an emulsifier, between about 1% and about 25% by weight titanium dioxide pigment, and a filler.

13. The reflective asphaltic emulsion of claim 12, wherein the filler comprises diatomaceous earth.

14. The reflective asphaltic emulsion of claim 2, comprising emulsified asphaltic particles having average greatest dimensions in the range of about 15 to about 50 microns.

\* \* \* \* \*